UNITED STATES PATENT OFFICE.

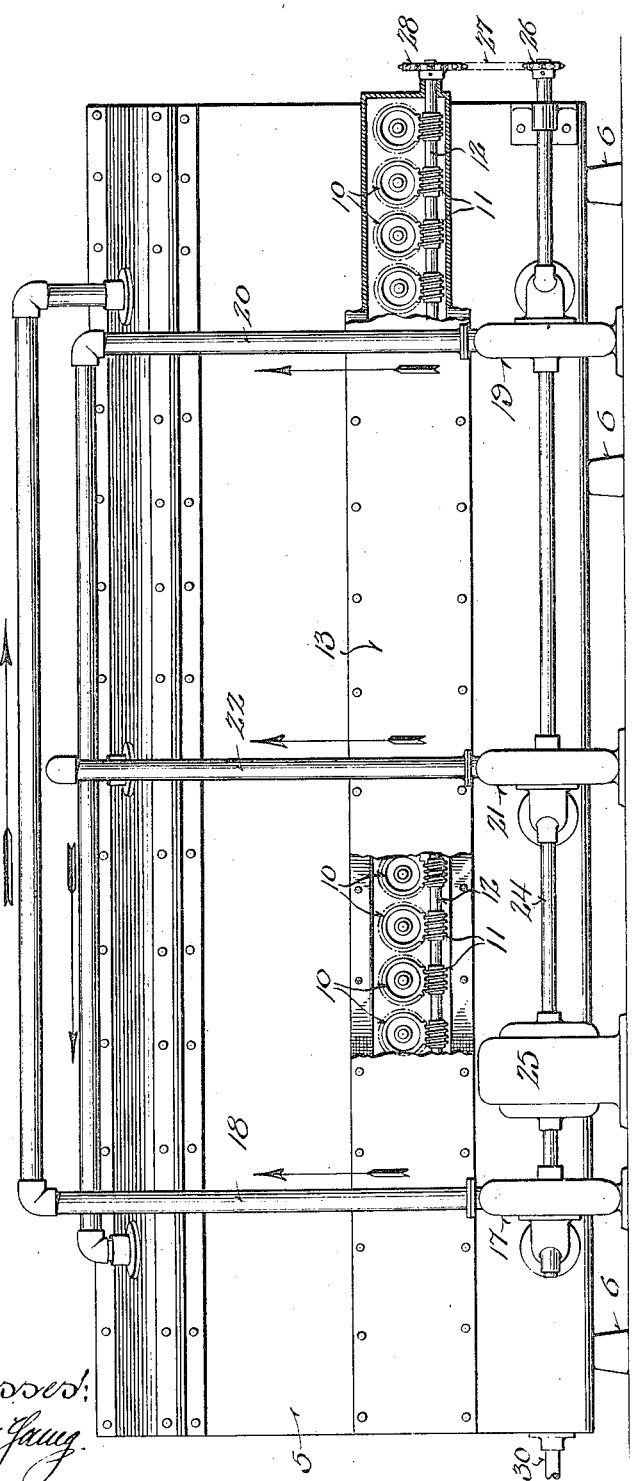

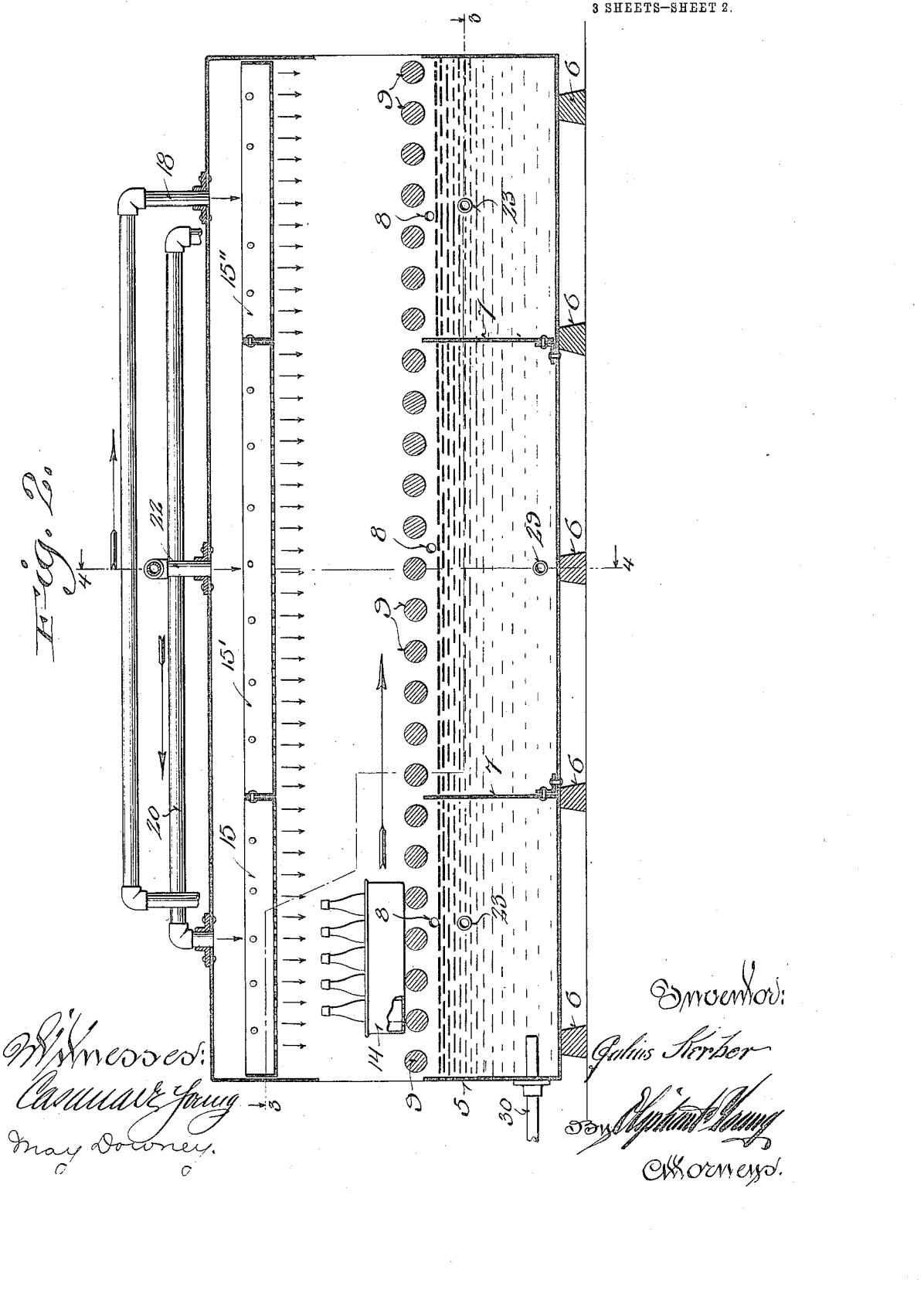

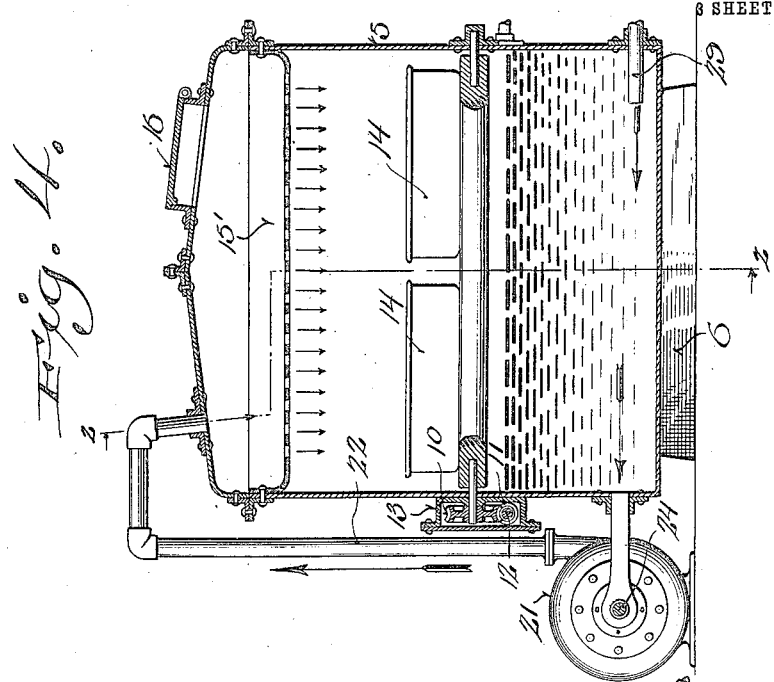
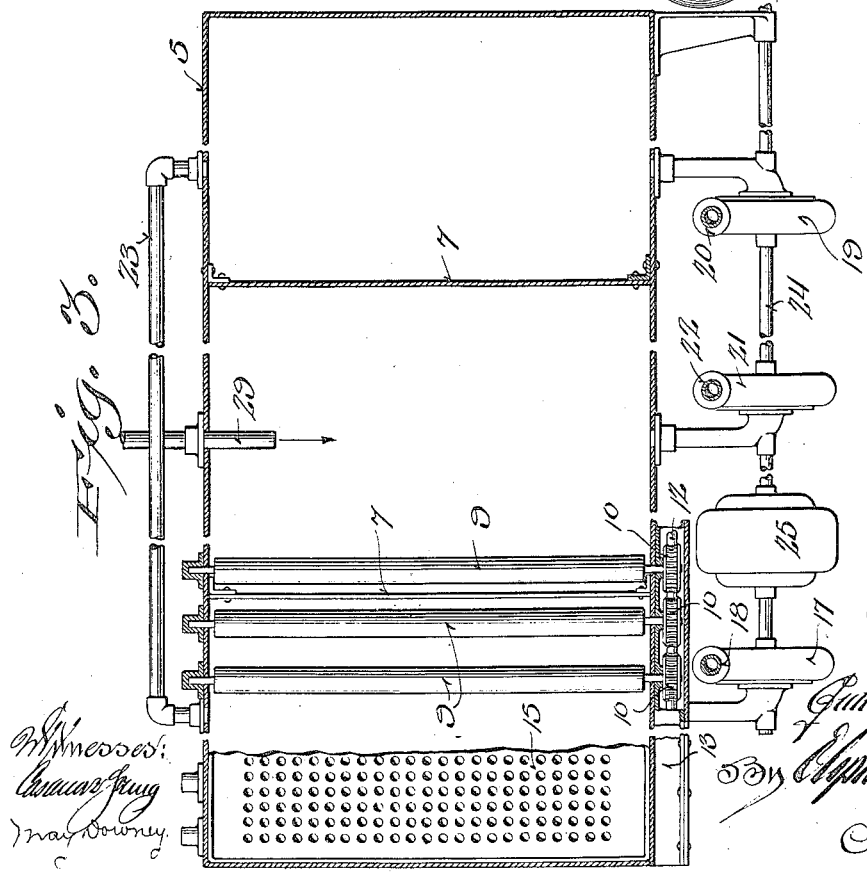

JULIUS KERBER, OF WEST BEND, WISCONSIN.

PASTEURIZER.

1,127,634. Specification of Letters Patent. Patented Feb. 9, 1915.

Application filed August 4, 1913. Serial No. 782,853.

*To all whom it may concern:*

Be it known that I, JULIUS KERBER, a citizen of the United States, and resident of West Bend, in the county of Washington and State of Wisconsin, have invented certain new and useful Improvements in Pasteurizers; and I do hereby declare that the following is a full, clear, and exact description thereof.

My invention consists in what is herein particularly set forth with reference to the accompanying drawings and pointed out in the claim of this specification, its object being to provide simple, economical and efficient pasteurizing apparatus especially designed for the treatment of bottled beer and having the advantages subsequently specified.

Figure 1 of the drawings represents a side elevation of a pasteurizing apparatus in accordance with my invention partly broken away; Fig. 2, a vertical section of the same longitudinally thereof, the section being indicated by line 2—2 in Fig. 4; Fig. 3, a plan view of said apparatus contracted and partly in horizontal section indicated by line 3—3 in Fig. 2, and Fig. 4, a cross-section of the same indicated by line 4—4 in Fig. 2.

Referring by numerals to the drawings, 5 indicates a rectangular covered tank resting on sills 6, and rising from the bottom of the tank to a predetermined height are transverse partitions 7 by which said tank is divided into three water compartments, each having an overflow outlet 8. Journaled in side bearings of the tank above the water level of its compartments are a series of parallel transverse preferably wooden rollers 9 at suitable intervals apart, and fast on one journal of each roller, outside of said tank is a worm-wheel 10 in mesh with one of a series of worms 11 on a driven shaft 12 for which the ends of a gear-casing 13 is provided with bearings, said rollers constituting a conveyer for steaming trays 14 in which the bottle goods to be pasteurized are carried, the bottom of the trays being perforated. The loaded trays are fed to the conveyer through an opening in one end of the tank and discharged through an opening in the opposite end of said tank, as indicated in Fig. 2, and, as indicated in Fig. 4, the width of the apparatus is such that two parallel series of said trays may be operated upon at the same time, or said apparatus may be indefinitely widened to increase its capacity.

Supported in the tank, above the end openings therein for the loaded trays, are pans 15, 15', 15'' having perforated bottoms and corresponding in number to the aforesaid water compartments with which they register, and in Fig. 4, the tank-cover is shown provided with a manhole having a closure 16.

Reading from the left of Fig. 1, a centrifugal pump 17 in connection with the first water compartment of the tank discharges through a pipe 18 into the pan 15'', and a similar pump 19 in connection with the third water compartment of said tank discharges through a pipe 20 into the pan 15. Another centrifugal pump 21 in connection with the middle compartment of the tank discharges through a pipe 22 into the middle pan 15' and a horizontal pipe 23 connects the first and third water compartments of said tank.

A single shaft 24 is shown common to all the pumps, said shaft being preferably that of an electric-motor 25. A sprocket-wheel 26 is shown fast on the shaft 24 and connected by a link-belt 27 with a similar wheel 28 fast on the worm-shaft.

A steam-discharge pipe 29 is shown extending into the middle water-compartment of the tank to thus provide for heating of the contents of said compartment, and a similar pipe 30 is shown leading into the front end compartment of said tank to provide for heating the contents thereof.

In practice the water in the first and third compartments of the tank (connected by the pipe 23) is of equalized temperature lower than the water in the intermediate compartment of said tank. The loaded trays are traveled slowly by the roller conveyer in the direction indicated by an arrow in Fig. 1, under the several pans aforesaid to effect a warming, pasteurizing and cooling of the bottled goods in said trays without submergence of the same.

I claim:—

A pasteurizing apparatus comprising a rectangular covered tank having opposite end openings, transverse partitions rising from the bottom of the tank to divide the same into three compartments, a series of parallel rollers arranged in the tank transversely of the same between said end openings, means for simultaneously driving all the rollers in the same direction, whereby provision is had for conveying steaming-trays of bottled goods through the tank longitudinally of the same over the water level of its compartments; pans having perforated bottoms and arranged in the upper portion of the tank to individually register with one of said compartments, means for independent attemperation of water in each tank-compartment, that in the first and third compartments being of an equalized temperature lower than that in the intermediate compartment; and means for circulating the attemperated water from each of said compartments through the pan in register therewith.

In testimony that I claim the foregoing I have hereunto set my hand at West Bend, in the county of Washington and State of Wisconsin, in the presence of two witnesses.

JULIUS KERBER.

Witnesses:
A. G. LANGENBACH,
JOSEPH M. O'MEARA.